US010223296B2

(12) United States Patent
Bendiabdallah et al.

(10) Patent No.: US 10,223,296 B2
(45) Date of Patent: Mar. 5, 2019

(54) METHOD OF TRANSFERRING CONFIGURATION INFORMATION FOR A CONNECTED OBJECT

(71) Applicant: Orange, Paris (FR)

(72) Inventors: Halim Bendiabdallah, Vaucresson (FR); Geneviéve Dijoux, Paris (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/277,850

(22) Filed: Sep. 27, 2016

(65) Prior Publication Data

US 2017/0091126 A1 Mar. 30, 2017

(30) Foreign Application Priority Data

Sep. 28, 2015 (FR) ..................... 15 59102

(51) Int. Cl.
*G06F 13/10* (2006.01)
*G06F 13/38* (2006.01)
*G06F 13/42* (2006.01)

(52) U.S. Cl.
CPC .......... *G06F 13/102* (2013.01); *G06F 13/385* (2013.01); *G06F 13/4282* (2013.01)

(58) Field of Classification Search
CPC .... G06F 3/0227; G06F 3/0628; G06F 3/0632; G06F 9/4411; G06F 9/4413; G06F 9/4415; G06F 9/44505; G06F 9/455; G06F 13/10; G06F 13/102; G06F 13/105; G06F 13/107; G06F 13/4265; G06F 13/4282; G06F 15/177; G05F 13/385
See application file for complete search history.

(56) References Cited

U.S. PATENT DOCUMENTS

| | | | |
|---|---|---|---|
| 2005/0149204 A1* | 7/2005 | Manchester | H04L 29/06 700/1 |
| 2006/0035527 A1 | 2/2006 | Numano | |
| 2009/0300239 A1 | 12/2009 | Hubo et al. | |
| 2011/0038005 A1* | 2/2011 | Ochiai et al. | G03G 15/5075 358/1.15 |
| 2012/0265988 A1* | 10/2012 | Ehrensvard | G06F 21/35 713/165 |
| 2013/0179689 A1* | 7/2013 | Matsumoto | G06F 8/61 713/171 |

FOREIGN PATENT DOCUMENTS

CN 102004864 A * 4/2011

OTHER PUBLICATIONS

Preliminary Search Report dated Jun. 30, 2016 for French Application No. FR 1559102 filed Sep. 28, 2015.

* cited by examiner

*Primary Examiner* — Thomas J Cleary
(74) *Attorney, Agent, or Firm* — Knobbe, Martens, Olson & Bear, LLP

(57) ABSTRACT

One embodiment relates to a method of transferring configuration information for a connected object wherein the method is performed by a terminal. The method may comprise detecting a connection of a mass memory on a peripheral connector of the terminal, associating the detected mass memory with at least one item of configuration information for the connected object, obtaining the at least one item of configuration information, and transferring the at least one item of configuration information to the mass memory.

17 Claims, 3 Drawing Sheets

METHOD OF TRANSFERRING CONFIGURATION INFORMATION FOR A CONNECTED OBJECT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, the disclosure of French Patent Application FR 1559102, filed Sep. 28, 2015, is incorporated herein by reference in its entirety.

BACKGROUND OF THE INVENTION

Field of the Invention

Some embodiments described herein relate to the general field of connected objects.

Description of the Related Art

Some embodiments described herein relate more particularly to configuring connected objects, i.e. setting their parameters. No limitation is associated with the nature of the connected objects under consideration. They may equally well be objects relating to timekeeping (e.g. a watch), to home automation, to surveillance, to leisure (e.g. clothing), to health (e.g. activity tracker tools, sleep tracker tools, pill boxes, etc.), toys, etc.

An explosion is currently taking place in the market for connected objects. In known manner, such objects are connected to the public Internet network (indeed use is made of the term "the Internet of things") and they can communicate with other systems, such as for example a smartphone, a touch-sensitive digital tablet, and/or a computer in order to obtain or supply information. Such communication relies on a wired connection or on a wireless connection of Bluetooth™ or WiFi™ type. Such objects can thus be configured to collect and store information as a function of their environment (e.g. a user's heart rate for a heart rate monitor watch) or indeed to trigger an action as a function of information collected from the web (e.g. water a garden on the eve of a dry day). It should be observed that their primary purpose is not to act as computer peripherals or as interfaces giving access to the web; adding a web connection to such an object enables it to provide additional value in terms of function, use, information, and/or interaction with the environment. Interactivity with such objects is thus very important.

In order to use such a connected object, it is necessary beforehand to initialize it, i.e. to configure some number of parameters of the object, e.g. parameters specific to its use (e.g. frequency with which information is collected and/or returned, etc.), or parameters enabling it to connect with other systems. By way of illustration, for an object that is to connect to the Internet via a WiFi network, this initialization stage includes providing the object with mechanisms for making a connection to the WiFi network, e.g. by setting a login and a password enabling it to access the network, by setting a wired equivalent privacy (WEP) key, etc.

At present, in order to initialize a connected object, it is generally necessary either to use a personal computer (PC) to run an installation disk as supplied by the manufacturer of the connected object, or else to visit the manufacturer's web site in order to download software (commonly referred to as a "driver") that is specific to the connected object and appropriate for the operating system of the computer. Regardless of whether the software comes from a web site or from a compact disk read only memory (CD-ROM) or a digital versatile disk (DVD), once it has been loaded into the computer it is installed in its operating system. In order to be able to use the connected object, it is therefore necessary to run the software and follow the procedure in the software for installing and configuring the connected object (setting its parameters).

Nevertheless, it needs to be observed that most of this software specific to connected objects is available or can be downloaded and executed only by using a computer. However, the users of connected objects do not necessarily have such a computer permanently available to them. In particular, they may have only a mobile terminal such as a smartphone or indeed a touch-sensitive digital tablet.

At present, essentially for security reasons, there is no provision for mobile terminals such as smartphones or digital tablets to download specific software for initializing connected objects. In particular, such software acts at a very low level (i.e. at operating system level), and it constitutes a risk that is too great in terms of security for mobile terminals, which are more vulnerable than PC-type computers (i.e. more sensitive to viruses and Trojan horses in particular).

There therefore exists a need for a solution enabling a connected object to be configured without presenting the drawbacks of the prior art and suitable for use in particular from a mobile terminal.

SUMMARY OF THE INVENTION

In one embodiment, this need is satisfied in particular by proposing a method of configuring a connected object, the method being for performing by the connected object and comprising:
- a connection process for connecting the connected object as a mass memory to a peripheral connector of a terminal;
- a reception process for receiving at least one item of configuration information from the terminal via said connection; and
- a configuration process for configuring the connected object using said at least one item of configuration information.

Correspondingly, another embodiment provides a connected object comprising:
- a connection module configured to connect said connected object as a mass memory to a peripheral connector of a terminal;
- a reception module for receiving at least one item of configuration information coming from the terminal via said connection with the peripheral connector of the terminal; and
- a configuration module for configuring the connected object using said at least one item of configuration information.

Another embodiment provides a method of transferring configuration information for a connected object, the method being for performing by a terminal and comprising:
- a detection process for detecting a connection of a mass memory on a peripheral connector of the terminal;
- an association process for associating said detected mass memory with at least one item of configuration information for the connected object;
- an obtaining process for obtaining said at least one item of configuration information; and
- a transfer process for transferring said at least one item of configuration information to the mass memory.

Correspondingly, another embodiment provides a terminal having a peripheral connector and comprising:
- a detection module configured to detect connection of a mass memory to the peripheral connector;
- an association module configured to associate the detected mass memory with at least one item of configuration information for configuring a connected object;
- an obtaining module for obtaining said at least one item of configuration information; and
- a transfer module for transferring said at least one item of configuration information to the mass memory.

As used herein, and in conventional manner in computing, the term "mass memory" is used to mean a non-volatile memory of large capacity (i.e. it is capable of conserving stored information even when unpowered (e.g. not powered electrically)), and that can be written to or read from by way of example by a computer in the broad sense of the word (the computer may in particular be a mobile telephone or a smartphone). Known examples of mass memories include in particular a compact disk having a storage capacity lying in the range 200 megabytes (MB) to 900 MB, a DVD having a storage capacity in the range 4.7 gigabytes (GB) to 8.5 GB, a hard disk, or indeed a universal serial bus (USB) memory stick having a storage capacity in the range 4 GB to 128 GB. Nevertheless, it should be observed that these values are given purely by way of illustration and that the concept of "large" storage capacity is a concept that varies over time. Thus, the storage capacity of floppy disks grew progressively from 160 kilobytes (KB) through 320 KB, 720 KB, 1.44 MB up to 2.88 MB. Likewise, the first USB memory sticks had a storage capacity in the range 512 MB up to 2 GB, whereas nowadays they can have more than one hundred gigabytes.

Thus, some embodiments propose a simple solution enabling a connected object to be configured by any terminal, e.g. such as a mobile telephone or a digital tablet, without violating the security principles inherent to the terminal. This solution advantageously relies on the ability of the connected object to emulate a mass memory and to connect to the terminal via one of its peripheral connectors (also commonly referred to as an input/output connector or a computer connector). In other words, from the point of view of the terminal, the connected object is seen as a slave peripheral, and more precisely as a mass memory connected to one of its peripheral connectors and in which the terminal can act in standard manner to write configuration information for the connected object.

As a result, there is no need to have recourse to a driver that is specific to the connected object and to the operating system of the terminal in order to be capable of initializing the object from the terminal. On the contrary, some embodiments can rely on conventional communication protocols between the terminal and a peripheral connected to its peripheral connector. It also relies in most advantageous manner on the various operating systems that exist for terminals, and in particular for the mobile terminals in widespread use using the Android™ and iOS™ operating systems.

For the terminal, it is necessary only to establish the link between the mass memory and the configuration information needed for setting the parameters of the object. Specifically, at least some of the configuration information may be specific to the connected object and to its use. For example, the link may be established during the association process of the transfer method by using an identifier of the mass memory. By way of example, this identifier may be the name of the connected object. In known manner, this identifier becomes available to the terminal as soon as its operating system recognizes that a mass memory has been connected to its peripheral connector.

In a variant, the link may be established using a file that is persistent (i.e. not deletable) and present in the mass memory, which file contains information about the object (and in particular some or all of the configuration information that is to be obtained).

Various connection components may be used for performing the methods described herein. In particular, the connected object may be connected using a universal serial bus (USB) type peripheral connector or preferably using a universal serial bus on-the-go (USB OTG) type peripheral connector.

In known manner, the USB OTG standard is an extension of the USB 2.0 standard that enables USB peripherals to have greater flexibility in managing USB connections. In particular, because of the OTG standard, two peripherals can exchange data directly without any need to pass via a host computer. In some embodiments, the OTG standard enables the terminal to switch into "master" mode so that connected objects are recognized as "slave" peripherals to which the terminal can write data (configuration information) in order to enable the object to self-configure using that data.

It should be observed that although some embodiments are particularly advantageous for a mobile terminal such as a smartphone or a digital tablet, they can also be used with a PC type computer. It is very simple to perform in that it relies essentially on providing a peripheral connection between the terminal and the connected object.

In a particular embodiment, during the obtaining process of the transfer method, said at least one item of configuration information is obtained via a graphics interface made available on the terminal.

This graphics interface serves in particular to enable a user of the terminal to input the information needed for configuring the connected object (e.g. login/password for connecting to the Internet, frequency at which the connected object should read data, or other parameters specific to the use of the object).

In a variant, some or all of the configuration information may be obtained by the terminal from a local area network or a wide area network.

In a particular implementation, during the transfer process of the transfer method, said at least one item of configuration information is transferred to the mass memory together with a digital signature or else in encrypted form.

This implementation enables the connected object to be sure that the configuration information transmitted thereto in accordance with the methods and devices described herein comes from an authorized terminal, and enables it to refuse to transfer this information from the terminal if this is not so.

Thus, correspondingly, in this implementation in which said at least one item of configuration information is received by the connected object from the terminal together with a digital signature or it is received in encrypted form, the method of configuring the connected object includes a verification process for verifying the digital signature or for decrypting said at least one item of encrypted configuration data, as a precondition to performing the process of configuring the connected object. In particular, the configuration method may also include a process that is triggered in the event of the verification process failing, whereby a message is sent to the terminal informing it of the failure to transfer said at least one item of configuration information.

Since the connected object is seen by the terminal as a mass memory, such a message may for example be in the form of a message notifying a write error in the mass memory (i.e. in reality in the connected object), and indicating that the mass memory is full so as to prevent the writing in the connected object of configuration information obtained by the terminal.

Protection methods other than a signature and/or encryption may naturally be used in some embodiments.

In a particular implementation, the transfer method further comprises a delete process of deleting said at least one item of configuration information in the mass memory, which process is triggered after configuring the connected object with said at least one item of configuration information.

This implementation provides a saving in terms of storage space in the connected object.

In another implementation of the transfer method, said at least one item of configuration information is identified by the terminal by using a code carried by the connected object.

By way of example, such a code is a quick response (QR) code (a code in the form of a matrix) or an address of the uniform resource locator (URL) type suitable for being scanned by the terminal or for being transferred to the terminal. By way of example, this enables the terminal to act automatically (i.e. without further intervention on the part of the user of the terminal) to download an application containing the configuration information that needs to be input or obtained in order to set the parameters of the connected object. This makes it possible to limit the actions required of the user for the purpose of configuring the connected object. It should be observed that the application as downloaded in this way to the mobile terminal may also include pre-set parameters for some or all of the configuration information required for initializing the connected object.

In a particular implementation, the various processes of the transfer method and/or of the configuration method are determined by program instructions for computers or microprocessors.

Consequently, some embodiments also provide a computer or microprocessor program on a data medium, the program being suitable for being performed in a terminal or more generally in a computer, the program including instructions adapted to perform the processes of the transfer method as described above.

Some embodiments also provide a computer or microprocessor program on a data medium, the program being suitable for being performed in a connected object or more generally in a computer, the program including instructions for performing processes of a configuration method as described above.

Each of these programs may make use of any programming language, and may be in the form of source code, object code, or code intermediate between source code and object code, such as in a partially complied form, or in any other desirable form.

Some embodiments also provide a computer readable data medium including computer program instructions as mentioned above.

The data medium may be any entity or device capable of storing the program. For example, the medium may comprise storage components, such as a read only memory (ROM), e.g. a compact disk (CD) ROM or a microelectronic circuit ROM, or indeed magnetic recording components, e.g. a floppy disk or a hard disk.

Furthermore, the data medium may be a transmissible medium such as an electrical or optical signal suitable for being conveyed via an electrical or optical cable, by radio, or by other approaches. In some embodiments, the program may in particular be downloaded from an Internet type network.

Alternatively, the data medium may be an integrated circuit in which the program is incorporated, the circuit being adapted to execute or to be used in the execution of the method in question.

Another embodiment provides a system for configuring a connected object, the system comprising:
  a terminal as described herein having a peripheral connector; and
  a connected object as described herein suitable for being connected to the peripheral connector in order to be configured.

The system benefits from the same advantages as described above for the transfer and configuration methods and for the terminal and for the connected object.

In other implementations and embodiments, it is also possible to envisage that the transfer method, the configuration method, the terminal, the connected object, and the configuration system present in combination some or all of the above-specified characteristics.

BRIEF DESCRIPTION OF THE DRAWINGS

Other characteristics and advantages of some embodiments appear from the following description given with reference to the accompanying drawings, which show an implementation having no limiting character. In the figures.

DETAILED DESCRIPTION OF THE PREFERRED EMBODIMENT

Figure 1:
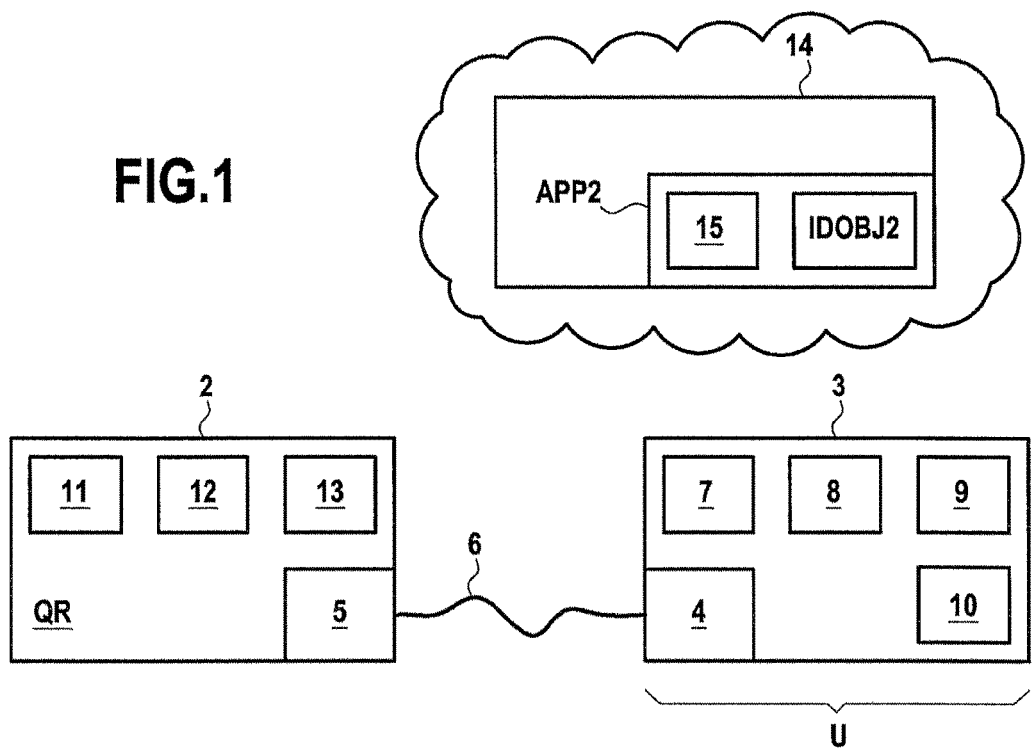
FIG. 1 is a diagram of a particular embodiment of a system for configuring a connected object.

FIG. 1 shows, in its environment, a particular embodiment of a configuration system 1.

In the embodiment shown in FIG. 1, the configuration system 1 enables a user U of a connected object 2 to use the terminal 3 for the purpose of configuring that object (or indeed initializing it or setting its parameters). The connected object 2 and the terminal 3 are as described herein.

No limitation is associated with the nature of the connected object 2. It may equally well be an object in the field of timekeeping (e.g. a watch), of home automation, of surveillance, of leisure (e.g. clothing), of health (activity tracker tools, sleep tracker tools, pill boxes, etc.), toys, etc. As mentioned above, such a connected object is for connection to the public Internet network and is adapted to communicate with other systems (e.g. an application) in order to obtain or provide information.

In the presently-described implementation, the terminal 3 is a mobile terminal suitable for communicating with a mobile telecommunications network, such as for example the 3rd generation (3G) network or the 4th generation (4G) network. The mobile terminal may in particular be a smartphone or indeed a digital tablet.

In a variant, the terminal 3 may be a fixed terminal, such as a personal computer (PC).

Naturally, terminals of types other than those mentioned above could be used for implementing the methods described herein, providing they have appropriate connection components.

More precisely, in some embodiments, the terminal 3 has one or more peripheral connectors 4, also known as input/output connectors or computer connectors. Such a connector enables a suitable cable to connect peripheral equipment to the terminal 3 by being plugged to the connector so as to add additional functions to the terminal. Such peripheral equipment conventionally includes input peripherals enabling information to be supplied to the terminal 3, such as a keyboard for example, output peripherals serving to output information from the terminal 3, such as for example: a loudspeaker, a headset, a printer; or indeed input/output peripherals that operate in both directions, such as for example a memory stick, etc.

In the presently-described embodiment, the connector 4 is a universal serial bus on-the-go (USB OTG) connector. In known manner, the USB OTB standard is an extension of the USB 2.0 standard that enables USB peripherals to have the advantage of flexibility in managing USB connections. More precisely, two pieces of equipment can use this standard to exchange data in master/slave mode directly, i.e. without needing to pass via host equipment (e.g. a computer). Equipment that is compatible with the USB OTG standard has a connector of mini-AB or micro-AB type, i.e. equally capable of accepting an A plug (master) or a B plug (slave). There is no need for both pieces of equipment to be compatible with the USB OTG standard in order to communicate, it suffices for one of them to be compatible in order to enable a point-to-point connection to be established between the two pieces of equipment. If the other piece of equipment does not support the USB OTG standard, then the equipment that does support it will be the master of the communication. Naturally, equipment that is compatible with the USB OTG standard also retains the conventional ability to connect with host equipment.

In the presently-described embodiment, it is assumed that the terminal 3 and the connected object 2 are both compatible with the USB OTG standard. In other words, the connected object 2 is also provided with a USB OTG type peripheral connector 5 enabling it to be connected to the terminal 3 via a mini-A/mini-B or micro-A/micro-B cord or cable 6. The cable 6 is thus connected at one end to the connector 4 of the terminal 3 and at the other end of the connector 5 of the connected object 2. The cable thus enables the terminal 3 and the connected object 2 to communicate with each other, and more particularly it enables the connected object 2 to be configured via the terminal 3, as described in detail below.

It should be observed that in the presently-described embodiment involving two pieces of USB OTG compatible equipment, it is the (A/B) type of the connector of the cable on the mini-AB (or micro-AB) socket at each end of the cable that serves to specify which of the two pieces of equipment is to be the host, i.e. the master of the communication. A reversal of the master/slave roles can be envisaged subsequently after a process of negotiation between the two pieces of equipment using the host negotiation protocol (HNP).

The USB OTG standard is itself known and is not described in greater detail herein. More details about this standard can be found in particular at the following web sites:

www.usb.org/developers/onthego/USB_OTG_Intro.pdf
and
fr.wipipedia.org/wiki/USB-On-The-Go Thus, in the presently-described embodiment, having recourse to USB OTG type connectors enables the terminal 3 to switch into "master" mode and the connected object 2 to be recognized by the terminal 3 as a slave peripheral in which it can write data.

In a variant, other types of connection components may be envisaged providing they enable the terminal 3 to recognize the connected object 2 as a peripheral and providing they make available such a master/slave mode of communication between the terminal 3 and the connected object 2 so as to enable the terminal 3 to write data in the connected object 2. For example, if the terminal 3 is a computer, USB type connectors may be used to connect the terminal 3 to the connected object 2, which connectors need not necessarily be compatible with the OTG standard.

Figure 2:
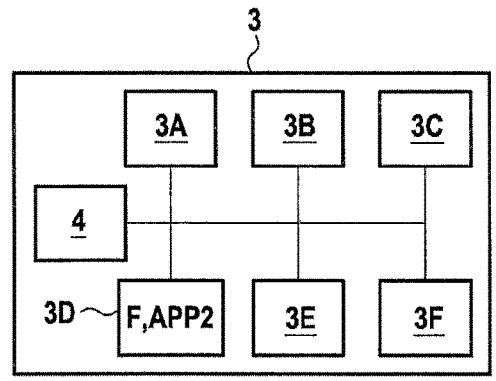
FIGS. 2 and 3 show the hardware architecture of the connected object and of a FIG. 1 system terminal used for configuring the connected object, in a particular embodiment.

In the presently-described embodiment, the terminal 3 has the hardware architecture of a computer, as shown diagrammatically in FIG. 2. In addition to the peripheral connector(s) 4, it comprises in particular: a processor 3A; a random access memory (RAM) 3B; a read only memory (ROM) 3C; a rewritable non-volatile memory 3D; and a module 3E for communication on a mobile telecommunications network; all of which are themselves known. Furthermore, the terminal 3 is provided with input/output components 3F enabling it to interact with the user U of the terminal, such as for example a screen, a keypad, a microphone, and a loudspeaker, all of which are known.

The ROM 3C of the terminal constitutes a data medium as described herein that is readable by the processor 3A and that stores a computer program including instructions for executing processes of a transfer method as described herein. In equivalent manner, the computer program defines functional modules that are constituted in full or in part by software, relying on the above-mentioned hardware components of the terminal 3, namely and more precisely: a detection module 7 coupled to the USB OTG peripheral connector 4; an association module 8; an obtaining module 9 for obtaining information for configuring connected objects making use of a graphics interface that is to be displayed on the screen on the terminal 3 and that is to interact with the input/output components 3F of the terminal 3; and a transfer module 10 for transferring the configuration information that has been obtained via the USB OTG peripheral connector 4. These modules are described in greater detail below with reference in particular to FIGS. 4 and 5.

Figure 3:
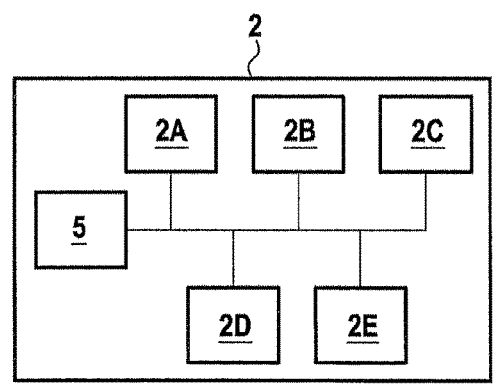

In similar manner, in the presently-described embodiment, the connected object 2 also has the hardware architecture of a computer, as shown diagrammatically in FIG. 3. In addition to the peripheral connector(s) 5, it comprises in particular: a processor 2A; a RAM 2B; a ROM 2C; a rewritable non-volatile memory 2D; and a communication module 2E; e.g. a Bluetooth or WiFi module enabling it to connect to the public Internet network; and themselves known.

The ROM 2C of the connected object 2 constitutes a data medium as described herein that is readable by the processor 2A and that stores a computer program including instructions for executing processes of a configuration method as described herein. The computer program defines in equivalent manner functional modules constituted in full or in part by software, relying on the above-mentioned hardware components of the connected object 2, and more precisely, specifically: a connection module 11 coupled to the USB OTG peripheral connector 4 and suitable for emulating a mass memory relative to the terminal 3 and for receiving configuration information therefrom; and a (self)configuration module 12 for configuring the connected object 2 on the basis of the received configuration information. In the presently-described embodiment, the configuration module 12 is controlled (i.e. activated or deactivated) by a verification module 13 suitable for verifying that the received configuration information does indeed come from equipment that is authorized to participate in configuring the connected object 2. These functional modules are described in greater detail below with reference in particular to FIGS. 4 and 5.

Figure 4:
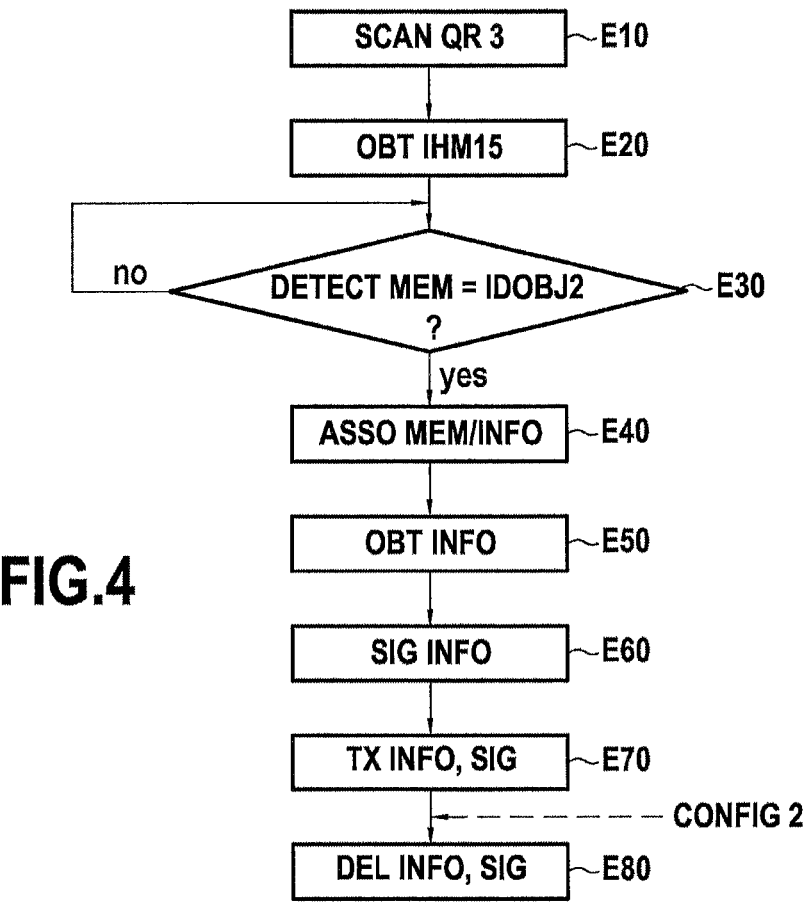
FIGS. 4 and 5 are flow charts showing the main processes of an exemplary transfer method and of an exemplary configuration method, as performed by the configuration system of FIG. 1.
Figure 5:
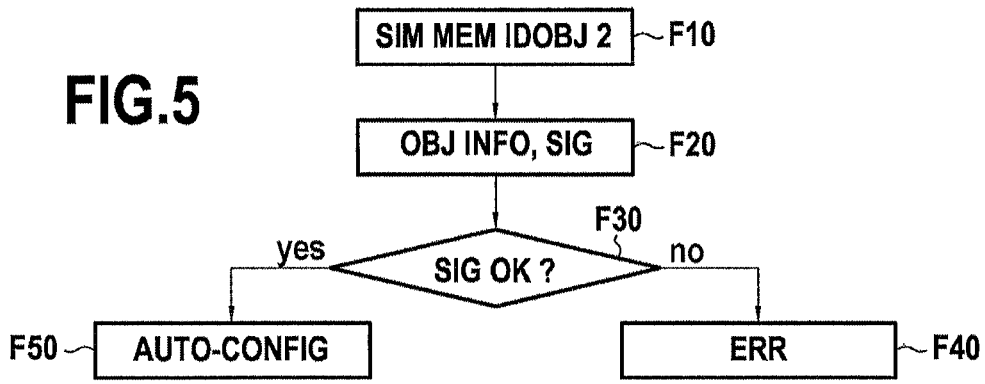

FIGS. 4 and 5 are flow charts showing the main processes respectively of an exemplary transfer method and of an exemplary configuration method as performed by the terminal 3 and by the connected object 2 in some embodiments in order to enable the user U to set directly the parameters of the connected object 2 from the terminal 3 via the USB OTG cable 6.

Figure 6:
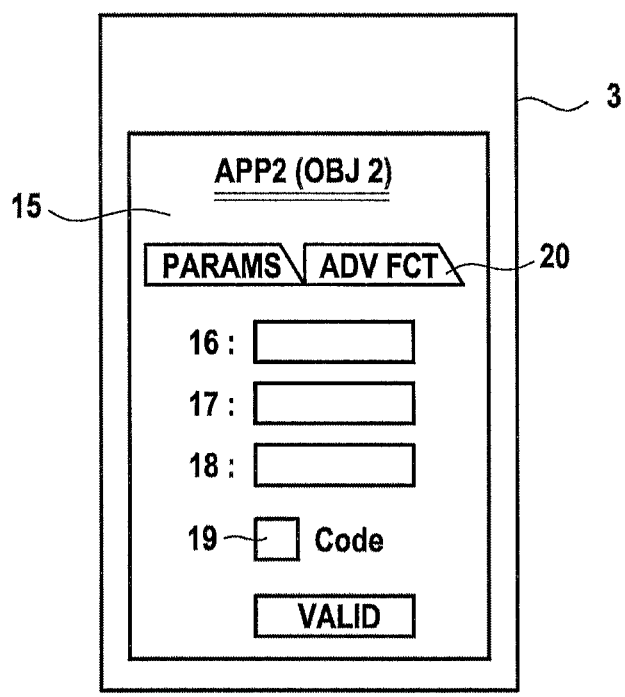
FIG. 6 shows an example of a graphics interface that may be used in some embodiments for configuring the FIG. 1 connected object.

In the presently-described implementation, it is assumed that the connected object 2 carries a quick response (QR) code representing a universal resource locator (URL) giving access to a remote server 14, e.g. via the public Internet network, which server stores a software application APP2 specific to the connected object 2. This application APP2 provides a graphics interface for making it easier for the user terminal 3 to configure the connected object 2, and in particular for enabling the user to input the configuration information that is needed for setting parameters in the object. An example of such a graphics interface 15 is shown in FIG. 6 and is described in detail below.

In a variant, a code other than a QR code should be provided on the connected object 2, e.g. the URL of the remote server 14.

In the presently-described implementation, it is assumed that the user U of the terminal 3 scans the QR code on the connected object 2 using the terminal 3, in conventional manner, using an application provided for this purpose and already installed on the terminal 3 (process E10). The terminal 3 capturing the QR code causes the terminal to use its communication module 3E and the mobile telecommunications network to which it is connected to download the application APP2 stored on the remote server 14 (process E20). By way of example, the application APP2 may be installed in the non-volatile memory 3D of the terminal 3. It implements some or all of the above-described functional modules of the terminal 3, and in the description below it is considered as constituting an integral element of the terminal 3, such that these modules are referred to in the description below interchangeably as modules of the software application APP2 or as modules of the terminal 3.

Nevertheless, no limitation is associated with the way in which the terminal 3 obtains the application APP2 and installs it in order to benefit from the graphics interface 15.

In the presently-described implementation, the application APP2 specific to the connected object 2 also includes an identifier IDOBJ2 associated with the connected object 2 and with the configuration information required for that object. This identifier IDOBJ2 is used by the software application APP2 in order to scan the memory disks present and listed by the terminal 3 and to determine whether the connected object 2 can be configured in the event of detecting a disk with this identifier (test process EN).

In a variant, this identifier IDOBJ2 may be contained in the QR code scanned by the user U using the terminal 3 and may be used for setting parameters of the application APP2.

In a variant, configuration of the connected object 2 is not launched automatically by the software application APP2 on detecting a memory disk with the identifier IDOBJ2, but only after intervention by the user U.

It is assumed that in order to enable the connected object 2 to be configured from the terminal 3 as described herein, the user U connects the connected object 2 to the terminal 3 by plugging the ends of cable 6 into the USB OTG peripheral connectors 4 and 5.

With reference to FIG. 5, as a result of making this connection, the connection module 11 of the connected object 2 acts with respect to the terminal 3 by emulating a mass memory (process F10). In other words, as a result of being connected to the USB OTG peripheral connector 4 of the terminal 3, the connected object 2 is recognized by the operating system of the terminal 3 (which acts as the detection module 7) as being a mass memory (e.g. a USB memory stick), i.e. as being a memory disk where it can write and read data via the USB OTG connection as set up in this way over the cable 6. This recognition results from the connected object 2 being connected to the USB OTG peripheral connector 4 of the terminal 3 and from various transactions taking place between the connected object 2 and the terminal 3 (i.e. between the slave and the master), in compliance with the USB OTG standard and in known manner. In particular, during these transactions, the connected object 2 declares itself to the terminal 3 as a mass memory.

The connection module 11 of the connected object 2 is also configured so that the mass memory emulated in this way with the terminal 3 is identified by the identifier IDOBJ2. Thus, as a result of connecting the connected object 2 to the terminal 3 via the USB OTG cable 6, the detection module 7 of the terminal 3 detects the presence of a mass memory with the identifier IDOBJ2 stored in the application APP2 (response "yes" to test process E30 in FIG. 4).

Figure 7:
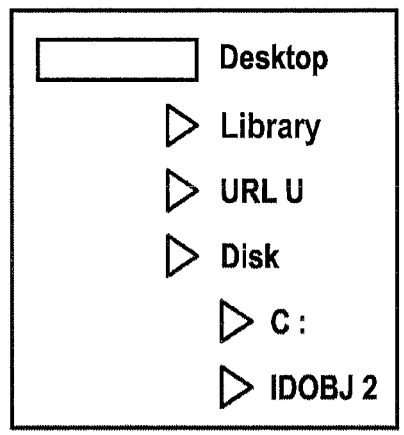
FIG. 7 shows a list of memory disks seen by the terminal after connection of the connected object during the transfer method as described herein.

By way, of example, FIG. 7 shows the memory disks detected by the operating system of the terminal 3 after the connected object 2 has been connected. These disks are listed in the category "disk" in FIG. 7 and they include, in addition to the disk C; a mass memory that is identified as IDOBJ2.

The application APP2 is informed of this detection and responds by triggering configuration of the connected object 2 via the graphics interface 15. More precisely, it uses the graphics interface 15 to request the user U to supply the configuration information needed for configuring the connected object 2. Thus, the terminal 3 establishes a link between the newly-detected mass memory (as emulated by the connected object 2) and the configuration information required for the connected object 2 via the identifier IDOBJ2 that is present both in the mass memory and in the application APP2. It is this identifier IDOBJ2 that enables the application APP2 (and more precisely the association module 8) to associate with the newly-detected mass memory with the configuration information required for configuring the object 2 as requested from the user U via the graphics interface 15 (process E40).

In a variant, the link between the mass memory detected by the terminal 3 and the information required for the connected object 2 can be established via a persistent file (i.e. a file that cannot be deleted) that is present in the mass memory and that contains information about the object (in particular some or all of the configuration information that is to be obtained).

FIG. 6 shows examples of configuration information requested via the graphics interface 15. In this implementation, the information comprises data for enabling the connected object 2 to connect to a local network, which data includes a WEP key 16, a name 17, a forename 18, and a flag 19 indicating whether or not a password is needed to make a connection. In the example shown in FIG. 6, it should also be observed that other configuration information is requested from the user U, corresponding to information required for configuring the functions that are to be performed by the connected object (item 20 in the graphics interface 15).

The user User U acting on the input/output components 3F of the terminal 3 to input and confirm these various data items enables the obtaining module 9 of the application APP2 to obtain the configuration information needed for configuring the object 2 (process E50).

Naturally, the example shown in FIG. 6 is given purely by way of illustration. Other configuration information could be envisaged. In addition, the configuration information may be obtained by interacting with the user U one or more times.

In a variant, the configuration information may also be obtained from entities other than the user U, e.g. by communicating with such entities via a local area network or a wide area network.

In the presently-described implementation, the configuration information as obtained in this way by the terminal 3 is stored progressively as it is obtained in a configuration file F that is stored in the non-volatile memory 3D of the terminal.

Thereafter, application APP2 generates a digital signature SIG on the basis of the configuration information contained in the file F, in conventional manner (process E60). Such a digital signature makes it possible in known manner to guarantee the integrity of the electronic data and to authenticate its author (specifically the terminal 3). It is also possible in conventional manner to generate asymmetrical encryption using a hashing function and a private encryption key stored by the application APP2, with the connected object 2 possessing the public encryption key associated with the private key.

Acting via the transfer module 10, the application APP2 then transfers the configuration information contained in the file F together with the generated digital signature SIG into the mass memory that is being emulated by the connected object 2 (process E70) via the USB OTG connection set up over the cable 6. For this purpose, the transfer module 10 writes the configuration information of the file F and the digital signature SIG in the mass memory identified by the identifier IDOBJ2 in standard manner, as is made possible by the USB OTG standard, i.e. as on any USB memory stick or external disk connected to the terminal via the USB OTG peripheral connector 4. By transferring the configuration information in this way to the mass memory identified by IDOBJ2, the transfer module 10 of the terminal 3 transfers the configuration information to the connected object 2 (i.e. writes the information therein).

In another implementation, the configuration information obtained by the obtaining module 9 may be transferred progressively, without previously being stored in a file in the non-volatile memory 3D, but while the information is being obtained via the graphics interface 15, for example.

In yet another implementation, the configuration information may be encrypted prior to being transferred to the connected object 2. Alternatively, other approaches may be envisaged for proving the integrity of the information and its author.

With reference to FIG. 5, the connection module 11 of the connected object 2, coupled to the peripheral connector 5, receives the configuration information transferred by the terminal 3 via the USB OTG cable 6 together with the associated digital signature SIG (process F20).

The digital signature SIG is then verified by the verification module 13 of the connected object 2 in known manner and using the public encryption key that it has available (test process F30).

If the digital signature SIG is not valid (response "no" to test process F30), the connection module 11 rejects the configuration information transmitted by the terminal 3 (process F40). For this purpose, the connection module 11 emulating a mass memory with respect to the terminal 3 sends a message to the terminal 3 informing it that the transfer has failed, e.g. a "write error" message or "memory full" message, of the kind specified in the USB standard.

If the digital signature SIG is valid (response "yes" to testprocess F40), the configuration module 14 proceeds to configure the connected object 2 with the configuration information it has received from the terminal 3 (process F50). By way of example, this process includes updating the firmware of the connected object 2 with the configuration information that has been obtained.

In the presently-described implementation, once this configuration has been performed, the terminal 3 is informed and the transfer module 10 of the terminal 3 deletes the configuration information and the digital signature SIG from the mass memory emulated by the connected object 2 (process E80). Nevertheless, this process is optional.

Some embodiments thus enable the connected object 2 to perform (self)configuration via any terminal, and in particular via a mobile terminal.

What is claimed is:

1. A method of transferring configuration information to a connected object, the method being performed by a mobile terminal and comprising:

detecting a connection of a mass memory on a peripheral connector of the mobile terminal, the mass memory being emulated by the connected object while the connected object is connected to the peripheral connector;

associating the detected mass memory with at least one item of configuration information for the connected object;

obtaining said at least one item of configuration information, the at least one item of configuration information comprising parameters specific to the use of the connected object; and transferring said at least one item of configuration information to said mass memory emulated by said connected object, the transferring said at least one item of configuration information to said mass memory comprising writing by said mobile terminal said at least one item of configuration information on said mass memory.

2. A method according to claim 1, wherein said peripheral connector is a universal serial bus (USB) connector or a universal serial bus on-the-go (USB OTG) connector.

3. A method according to claim 1, wherein said at least one item of configuration information is obtained via a graphics interface made available on the mobile terminal and/or from a local or wide area telecommunications network.

4. A method according to claim 1, wherein the process of associating the detected mass memory with at least one item of configuration information for the connected object comprises using an identifier of the mass memory.

5. A method according to claim 1, further comprising deleting said at least one item of configuration information in said mass memory, wherein said deletion is triggered after configuring the connected object with said at least one item of configuration information.

6. A method according to claim 1, wherein said at least one item of configuration information is identified by the mobile terminal by using a code carried by the connected object.

7. A method of connecting a connected object, this method being performed by said connected object and comprising:
- connecting the connected object as a mass memory to a peripheral connector of a mobile terminal, the connected object emulating the mass memory while the connected object is connected to the peripheral connector;
- receiving at least one item of configuration information from the mobile terminal via said connection, the at least one item of configuration information comprising parameters specific to the use of the connected object, the at least one item of configuration information from the mobile terminal being written by said mobile terminal on said mass memory emulated by said connected object; and
- configuring the connected object by means of said at least one item of configuration information.

8. A method according to claim 7, wherein said at least one item of configuration information is received from the mobile terminal together with a digital signature or wherein said at least one item of configuration information is received in encrypted form, said method further comprising verifying said digital signature or decrypting said at least one item of encrypted configuration information, as a precondition to performing the process of configuring the connected object.

9. A method according to claim 8, comprising, in the event of the verification process failing, sending a message to the mobile terminal indicating a failure of the transfer of said at least one item of configuration information.

10. A mobile terminal having stored thereon instructions for executing a method of transferring configuration information to a connected object when said instructions are executed by said terminal, wherein said method comprises:
- detecting a connection of a mass memory on a peripheral connector of the mobile terminal, the mass memory being emulated by the connected object while the connected object is connected to the peripheral connector;
- associating the detected mass memory with at least one item of configuration information for the connected object;
- obtaining said at least one item of configuration information, the at least one item of configuration information comprising parameters specific to the use of the connected object; and
- transferring said at least one item of configuration information to said mass memory emulated by said connected object, the transferring said at least one item of configuration information to said mass memory comprising writing by said mobile terminal said at least one item of configuration information on said mass memory.

11. A computer readable data medium having stored thereon instructions for executing a method of transferring configuration information to a connected object when said instructions are executed, wherein said method is adapted to be performed by a mobile terminal and comprises:
- detecting a connection of a mass memory on a peripheral connector of the mobile terminal, the mass memory being emulated by the connected object while the connected object is connected to the peripheral connector;
- associating the detected mass memory with at least one item of configuration information for the connected object;
- obtaining said at least one item of configuration information, the at least one item of configuration information comprising parameters specific to the use of the connected object; and
- transferring said at least one item of configuration information to said mass memory emulated by said connected object, the transferring said at least one item of configuration information to said mass memory comprising writing by said mobile terminal said at least one item of configuration information on said mass memory.

12. A mobile terminal fitted with a peripheral connector, said mobile terminal being configured to:
- detect connection of a mass memory to said peripheral connector, the mass memory being emulated by a connected object while the connected object is connected to the peripheral connector;
- associate the detected mass memory with at least one item of configuration information for configuring the connected object;
- obtain said at least one item of configuration information, the at least one item of configuration information comprising parameters specific to the use of the connected object; and
- transfer said at least one item of configuration information to said mass memory emulated by said connected object by writing said at least one item of configuration information on said mass memory.

13. A mobile terminal according to claim 12, wherein said mobile terminal is adapted to communicate over a mobile telecommunications network.

14. A system for configuring a connected object, the system comprising:
- a mobile terminal according to claim 12; and
- a connected object adapted to be connected to the peripheral connector of the terminal in order to be configured, wherein said connected object is configured to:
- connect said connected object as a mass memory to the peripheral connector of the terminal by emulating the mass memory while the connected object is connected to the peripheral connector;
- receive at least one item of configuration information coming from the terminal via said connection with the peripheral connector of the terminal, the at least one item of configuration information comprising parameters specific to the use of the connected object, the at least one item of configuration information from the mobile terminal being written by the mobile terminal on said mass memory emulated by said connected object; and
- configure the connected object using said at least one item of configuration information.

15. A connected object configured to:
connect said connected object as a mass memory to a peripheral connector of a mobile terminal by emulating the mass memory while the connected object is connected to the peripheral connector;
receive at least one item of configuration information coming from the terminal via said connection with the peripheral connector of the terminal, the at least one item of configuration information comprising parameters specific to the use of the connected object, the at least one item of configuration information from the mobile terminal being written by said mobile terminal on said mass memory emulated by said connected object; and
configure the connected object using said at least one item of configuration information.

16. A connected object having stored thereon instructions for executing a method of connecting said connected object when said instructions are executed by said connected object, wherein said method comprises:
connecting the connected object as a mass memory to a peripheral connector of a mobile terminal by emulating the mass memory while the connected object is connected to the peripheral connector;
receiving at least one item of configuration information from the terminal via said connection, the at least one item of configuration information comprising parameters specific to the use of the connected object, the at least one item of configuration information from the mobile terminal being written by said mobile terminal on said mass memory emulated by said connected object; and
configuring the connected object by means of said at least one item of configuration information.

17. A computer readable data medium having stored thereon instructions for executing a method of connecting a connected object when said instructions are executed, wherein said method is adapted to be performed by said connected object and comprises:
connecting the connected object as a mass memory to a peripheral connector of a mobile terminal by emulating the mass memory while the connected object is connected to the peripheral connector;
receiving at least one item of configuration information from the mobile terminal via said connection, the at least one item of configuration information comprising parameters specific to the use of the connected object, the at least one item of configuration information from the mobile terminal being written by said mobile terminal on said mass memory emulated by said connected object; and
configuring the connected object by means of said at least one item of configuration information.

* * * * *